UNITED STATES PATENT OFFICE.

CHARLES H. FOIT, OF IRONTON, OHIO.

PROCESS OF MAKING YEAST.

No. 863,976.  Specification of Letters Patent.  Patented Aug. 20, 1907.

Application filed April 8, 1907. Serial No. 367,033.

*To all whom it may concern:*

Be it known that I, CHARLES H. FOIT, a citizen of the United States, residing at Ironton, in the county of Lawrence and State of Ohio, have invented certain new and useful Improvements in Processes of Making Yeast; and I do declare the following to be a full, clear, and exact description of the invention, such as will enable others skilled in the art to which it appertains to make and use the same.

This invention relates to yeast, and more particularly to yeast which is to remain in the liquid form or condition, as contradistinguished from dry or cake yeast, which must be dissolved or made into a liquid or semi-liquid condition before being used, and the process of making the same.

The process of making the yeast is divided into three steps or stages in each of which the amount or proportions of the different ingredients is varied and the time is also varied in which said ingredients are permitted to remain in such stage or condition.

In the first stage the ingredients consist of water, one-half gallon; hops, one ounce; flour, one-half pound, and malt, one-quarter pound. These ingredients are thoroughly mixed or commingled in any suitable manner, and allowed to stand for forty-eight hours before it is ready for the next or second step.

In the second stage the mixture described for the first stage is taken, and nine gallons of water are added thereto; six ounces of hops; three pounds of flour and one-half pound of malt. This second mixture is allowed to stand twenty-four hours before it is used.

For the third stage, three quarts of the mixture of the second stage are taken, and thirty gallons of water are added thereto; one peck of potatoes and four pounds of flour. In using the potatoes they are cooked and the water is not drained off, but is used so that the entire strength of the potatoes is utilized. This third mixture is then set aside and kept for twelve hours before it is ready for use, as by mixing with it the desired quantity of flour and water to form a dough from which the bread can be baked.

If it is not desirable to use the yeast as soon as formed in the above described manner, it can be placed in air-tight jars or suitable receptacles and kept until it is desired to form a dough therefrom ready for baking.

Owing to the large amount of potatoes that enters into the yeast, the bread that is made therefrom is known upon the market as "potato bread."

Having described my invention, I claim:

The process of forming liquid yeast, which consists in mixing together one-half gallon of water, one ounce of hops, one-half pound of flour and one-quarter pound of malt, and letting the same stand for forty-eight hours, then mixing therewith nine gallons of water, six ounces of hops, three pounds of flour and one-half pound of malt and letting the same stand twenty-four hours, then mixing with three quarts of said last-mentioned mixture thirty gallons of water, one peck of cooked potatoes and the water in which they were cooked, and four pounds of flour and letting the same stand for twelve hours.

In testimony whereof I have hereunto set my hand in presence of two subscribing witnesses.

CHARLES H. FOIT.

Witnesses:
 A. R. JOHNSON,
 D. C. JONES.